United States Patent
Mal et al.

(10) Patent No.: US 7,524,916 B2
(45) Date of Patent: Apr. 28, 2009

(54) HYBRID SILICA POLYMER, METHOD FOR PRODUCTION THEREOF, AND PROTON-CONDUCTING MATERIAL

(75) Inventors: Nawal Kishor Mal, Tokyo (JP); Koichiro Hinokuma, Kanagawa (JP); Kazuhiro Noda, Kanagawa (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 11/568,368

(22) PCT Filed: Apr. 8, 2005

(86) PCT No.: PCT/JP2005/007273

§ 371 (c)(1),
(2), (4) Date: Nov. 16, 2006

(87) PCT Pub. No.: WO2006/008860

PCT Pub. Date: Jan. 26, 2006

(65) Prior Publication Data

US 2007/0213494 A1    Sep. 13, 2007

(30) Foreign Application Priority Data

Apr. 28, 2004    (JP) ............................. 2004-133395

(51) Int. Cl.
*C08G 77/22* (2006.01)
*C08G 75/00* (2006.01)
*C08G 75/04* (2006.01)
*H01B 1/00* (2006.01)

(52) U.S. Cl. .................... 528/30; 528/373; 528/374; 252/500

(58) Field of Classification Search ............... 528/30
See application file for complete search history.

(56) References Cited

U.S. PATENT DOCUMENTS

2004/0062970 A1 *  4/2004  Nomura et al. ............... 429/33
2006/0035129 A1 *  2/2006  Nomura et al. ............... 429/33

(Continued)

FOREIGN PATENT DOCUMENTS

JP          9-110989         4/1997

(Continued)

OTHER PUBLICATIONS

Walcarius et al. (Chem. Mater. 2003, 15, 4181-4192).*

(Continued)

*Primary Examiner*—Randy Gulakowski
*Assistant Examiner*—Robert Loewe
(74) *Attorney, Agent, or Firm*—K&L Gates LLP

(57) ABSTRACT

Hybrid silica polymer applicable to electrochemical elements and a method for economical production thereof, the former excelling in thermal stability, mechanical stability, solvent resistance, and proton conductivity at low humidity is provided. The method includes a step of heating a mixture of 3-mercaptopropyltrialkoxylsilane, surfactant, water, and base or acid for their reaction with one another at 25 to 180° C., thereby providing a hybrid thiol group-containing silica polymer, and an optional step of oxidizing said hybrid thiol group-containing silica polymer with a peroxide, thereby giving a hybrid silica polymer which is composed of hybrid (thiol group-containing and/or sulfonic group-containing) silica polymer. The resulting silica polymer is used as a proton conducting material for electrochemical elements such as fuel cells, capacitors, and electrolytic cells.

1 Claim, 2 Drawing Sheets

U.S. PATENT DOCUMENTS

| | | | |
|---|---|---|---|
| 2006/0082951 A1* | 4/2006 | Hirata et al. | 361/524 |
| 2006/0083962 A1* | 4/2006 | Takekawa et al. | 429/13 |
| 2006/0141313 A1* | 6/2006 | Nomura et al. | 429/30 |
| 2006/0219981 A1* | 10/2006 | Miyama et al. | 252/500 |
| 2006/0263660 A1* | 11/2006 | Takaoka et al. | 429/33 |
| 2006/0292413 A1* | 12/2006 | Takaoka | 429/30 |
| 2007/0037032 A1* | 2/2007 | Nishiyama et al. | 429/33 |
| 2007/0196713 A1* | 8/2007 | Mah et al. | 429/33 |
| 2007/0213495 A1* | 9/2007 | Nomura et al. | 528/33 |

FOREIGN PATENT DOCUMENTS

| | | |
|---|---|---|
| JP | 2003-331644 | 11/2003 |
| JP | 2004/346316 | 12/2004 |
| WO | 03/041091 A1 | 5/2003 |
| WO | 2004/070738 | 8/2004 |
| WO | 2005/050700 | 2/2005 |

OTHER PUBLICATIONS

Melero et al. Journal of Materials Chemistry, 2002, 12, 1664-1670.*

Margolese et al. Chemistry of Materials, 2000, 12, 2448-2459.*

Hamoudi et al. Macroporous and Microporous Materials, 2003, 59, 195-204.*

Ganesan, Vellaichamy et al., Surfactant Templated Sulfonic Acid Functionalized Silica Microspheres as New Efficient Ion Exchangers and Electrode Modifiers, Lanmuir, Apr. 27, 2004, vol. 20, No. 9, pp. 3632 to 3640.

Slade, Robert C.T., et al., Proton conductivity in soloxane and ormosil ionomers prepared using mild solfonation methodologies, Solid State Ionics, 2001, vol. 145, No. 1 to 4, pp. 127 to 133.

Wu, Cuiming et al., "A new inorganic-organic negatively charged membrane: membrane preparation and characterizations," Journal of Membrane Science, 2003, vol. 224, Nos. 1 to 2, pp. 117 to 125.

Mikhailenko et al., "Solid electrolyte properties of sulfonic acid functionalized mesostructured porous silica," Microporous and Mesoporous Materials, 2002, vol. 52, No. 1, pp. 29-37.

* cited by examiner

F I G . 1
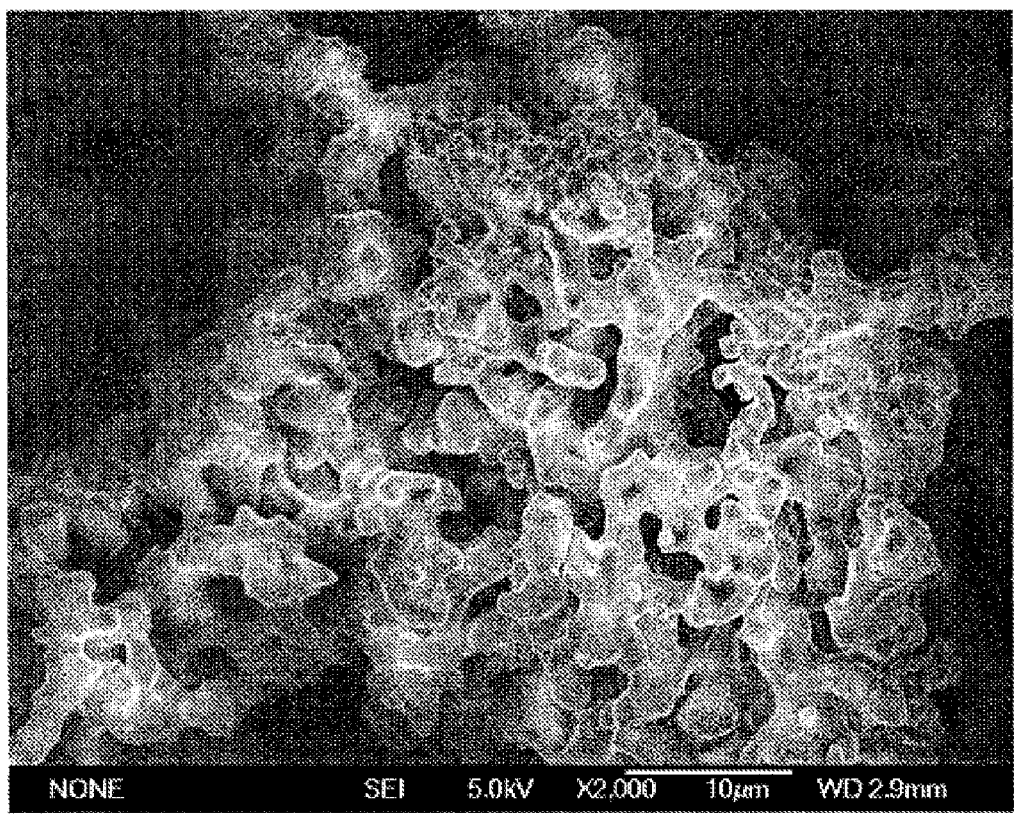

HYBRID SILICA POLYMER, METHOD FOR PRODUCTION THEREOF, AND PROTON-CONDUCTING MATERIAL

CROSS REFERENCE TO RELATED APPLICATIONS

The present application claims priority to Japanese Patent Document No. 2004-133395 filed on Apr. 28, 2004, the disclosure of which is herein incorporated by reference.

The present invention relates to a hybrid silica polymer having proton conductivity and, more particularly, to a hybrid silica polymer, a method for production thereof, and a proton-conducting material which can be adequately applied to electrochemical elements such as fuel cells, capacitors, and electrolytic cells.

Among conventional proton conductors is Nafion (registered trademark of Du Pont), which is an organic compound in the form of perfluoropolymer. This perfluoropolymer is composed of perfluorinated linear main chains and perfluorinated side chains having sulfonic groups (which function as the proton supplying site). Usually, Nafion contains only one sulfonic group (proton supplying site) per molecular weight of 1100. In other words, Nafion has a rather small ratio (by weight) of proton supplying site per molecular weight. Another disadvantage of Nafion is that its proton conductivity is so sensitive to humidity that it decreases below $10^{-6}$ S/cm at low humidity (say, <11% RH).

There has recently appeared a new proton-conducting material in the form of phosphosilicate, which is prepared by hydrolyzing tetraalkoxysilane with phosphoric acid to give a gel-like product and then heating it at a high temperature. (See Patent Document 1, for example.) Unfortunately, this phosphosilicate is not satisfactory in proton conductivity.

SUMMARY

The present invention was completed in view of the foregoing. It is an object of the present invention to provide a hybrid silica polymer, a method for production thereof, and a proton conducting material. The hybrid silica polymer is characterized by economical production, good thermal stability, good mechanical stability, good solvent resistance, and good proton conductivity at low humidity. The proton conducting material is suitable for application to various electrochemical elements.

As the result of their extensive investigation, the present inventors found a new hybrid silica polymer and an outstanding proton conducting material derived therefrom. This finding led to the present invention.

The present invention is directed to a hybrid silica polymer which comprises a hybrid (thiol group-containing and/or sulfonic group-containing) silica polymer being represented by the formula (1) below and accounting for more than 50 wt % of the entire constituents:

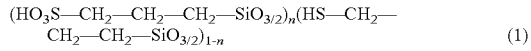

(where n=0 to 1)

The hybrid silica polymer should preferably be an amorphous material and a non-mesoporous material. In addition, the formula (1) should preferably have a value of n ranging from 0.03 to 1.

The present invention is also directed to a method for producing said hybrid silica polymer which comprises a step of heating a mixture of 3-mercaptopropyltrialkoxylsilane, surfactant, water, and base or acid for their reaction with one another at 25 to 180° C., thereby giving a hybrid thiol group-containing silica polymer, and an optional step of oxidizing said hybrid thiol group-containing silica polymer with a peroxide, thereby giving a hybrid silica polymer which is composed of hybrid (thiol group-containing and/or sulfonic group-containing) silica polymer being represented by the formula (1) below and accounting for more than 50 wt % of the entire constituents:

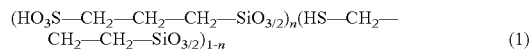

(where n=0 to 1)

The base or acid mentioned above should preferably be ammonium hydroxide.

The present invention is also directed to a proton conducting material which comprises a hybrid silica polymer which is a hybrid (thiol group-containing and/or sulfonic group-containing) silica polymer being represented by the formula (1) below and accounting for more than 50 wt % of the entire constituents:

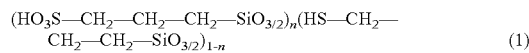

(where n=0 to 1)

Additional features and advantages of the present invention are described in, and will be apparent from, the following Detailed Description and the Figures.

BRIEF DESCRIPTION OF THE FIGURES

FIG. 1 is an SEM photograph showing one example of the hybrid silica polymer according to the present invention.

DETAILED DESCRIPTION

Figure 2:
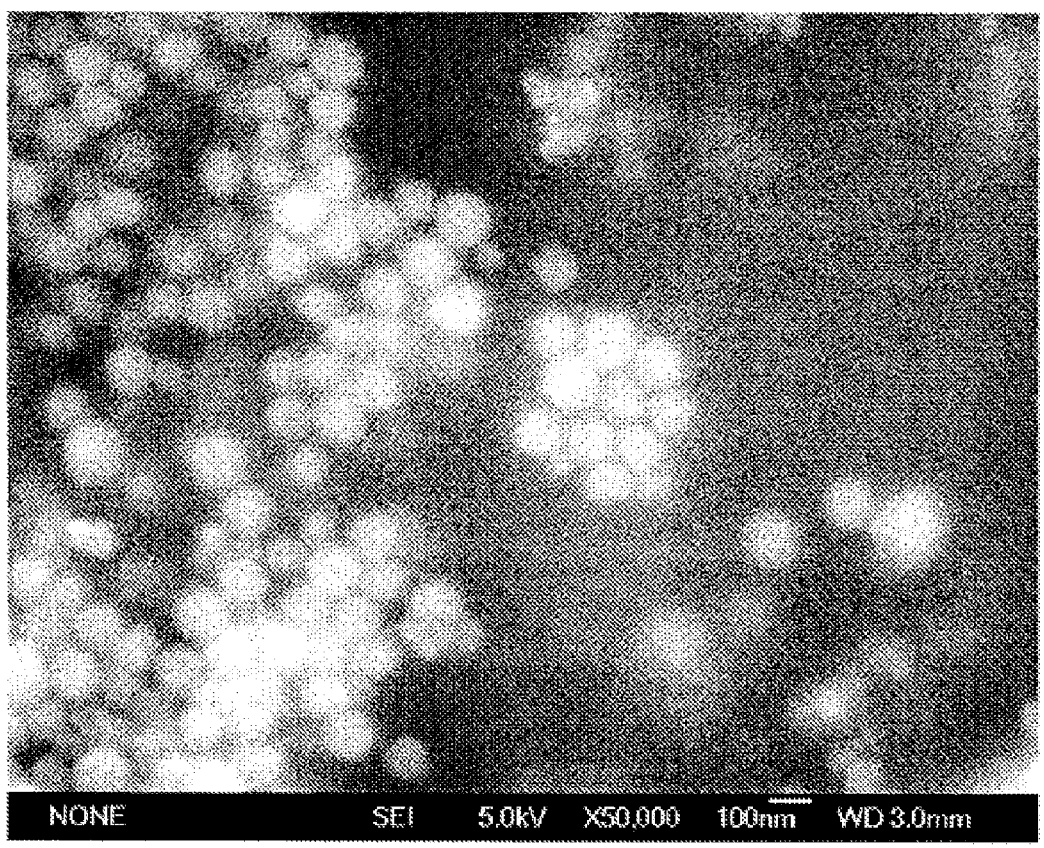
FIG. 2 is an SEM photograph showing another example of the hybrid silica polymer according to the present invention.

The hybrid silica polymer according to the present invention is a polymeric compound composed of an organic moiety and an inorganic moiety (which are joined together) as shown in the formula (1) below. The polymeric compound is a hybrid (thiol group-containing and/or sulfonic group-containing) silica polymer represented by the formula (1) below, and it accounts for more than 50 wt % of the entire constituents:

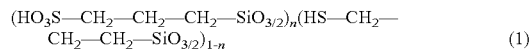

(where n=0 to 1)

The thiol and sulfonic groups in the formula (1) impart proton conductivity to the hybrid silica polymer. In the formula (1), the value of n should preferably be from 0.03 to 1, so that the hybrid silica polymer excels in thermal stability, mechanical stability, solvent resistance, and proton conductivity. The larger the value of n, the higher the proton conductivity.

The hybrid (thiol group-containing and/or sulfonic group-containing) silica polymer represented by the formula (1) should account for more than 50 wt %, preferably more than 90 wt %, and more preferably 100 wt %, of the entire constituents. The remainder may be $SiO_2$ units.

The hybrid silica polymer according to the present invention should preferably be an amorphous material and a non-mesoporous material.

The hybrid (thiol group-containing and/or sulfonic group-containing) silica polymer represented by the formula (1) above may be prepared by heating a mixture of 3-mercaptopropyltrialkoxylsilane, surfactant, water, and base or acid for their reaction with one another at 25 to 180° C., thereby giving a hybrid thiol group-containing silica polymer, and an optional step of oxidizing said hybrid thiol group-containing silica polymer with a peroxide.

The heating of a mixture of 3-mercaptopropyltrialkoxylsilane, surfactant, water, and base or acid gives a hybrid thiol group-containing silica polymer in gel form. This gel is freed of surfactant etc. and then oxidized (optionally) to convert the thiol group into the sulfonic group to give the desired hybrid silica polymer.

The above-mentioned reaction may involve 3-mercaptopropyltrialkoxylsilane, which is not specifically restricted. It may be replaced by 3-mercaptopropyltrimethoysilane (3-MPTMS for short) or 3-mercaptopropyletriethoxysilane (3-MPTES for short).

The reaction may involve typically a surfactant represented by $RN^+(CH_3)_3.X^-$ (where R denotes a $C_{6-18}$ alkyl group, and X denotes a bromine atom, chlorine atom, or hydroxyl group). R is exemplified by hexyl, octyl, decyl, dodecyl, tetradecyl, hexadecyl, and octadecyl groups. The surfactant should be added in an amount of 0.005 to 0.8 mol for 1 mol of 3-mercaptopropyltrialkoxylsilane.

The reaction may involve a base or acid, such as lithium hydroxide, sodium hydroxide, potassium hydroxide, magnesium hydroxide, calcium hydroxide, ammonium hydroxide, hydrogen chloride, and hydrogen bromide. The base or acid should be added in an amount of 0.2 to 3 mol for 1 mol of 3-mercaptopropyltrialkoxylsilane.

A preferred example of the base or acid is ammonium hydroxide. The reaction involving ammonium hydroxide gives a hybrid silica polymer in uniform spherical amorphous form and non-mesoporous form which has a large surface area and good proton conductivity.

Another preferred example of the base or acid is sodium hydroxide. The reaction involving sodium hydroxide gives a hybrid silica polymer in amorphous form and non-mesoporous form which has a large aggregate particle size and good thermal stability at high temperatures (which leads to high reliability).

The reaction may involve water in an amount of 30 to 120 mol for 1 mol of 3-mercaptopropyltrialkoxylsilane.

The hybrid thiol group-containing silica polymer may be produced by heating a mixture of 3-mercaptopropyltrialkoxylsilane, surfactant, water, and base or acid for their reaction with one another at 25 to 180° C. This reaction gives the silica polymer in gel form.

The thus obtained hybrid thiol group-containing silica polymer may optionally be oxidized with a peroxide. Prior to this oxidizing step, the gel should preferably be heated with ethanol and dilute hydrochloric acid so as to remove the surfactant (such as hexadecyltrimethylammonium bromide). Preferred examples of the peroxide used for optional oxidation include hydrogen peroxide, t-butylhydroperoxide $[(CH_3)_3C—O—O—H]$, and cumenehydroperoxide $[C_6H_5—C(CH_3)_2—O—O—H]$. Any other peroxides than listed above may also be used. In the formula (1) above, the value of n may vary depending on the duration of reaction with the peroxide.

The solvent for reaction should be properly selected according to the peroxide employed. It may be water for hydrogen peroxide; it may be water, butanol, or n-decane for t-butylhydroperoxide; and it may be butanol or n-decane for cumenehydroperoxide.

The above-mentioned process gives the hybrid silica polymer of the present invention. The hybrid silica polymer is an amorphous material and a non-mesoporous material. It contains thiol groups and/or sulfonic groups. It has one proton supplying site per molecular weight of 300. (In other words, it has a high ratio (by weight) of the proton supplying site per molecular weight.) Thus it exhibits good proton conductivity.

The hybrid silica polymer exhibits good thermal stability (up to about 150° C. when measured by TG-DTA), good mechanical stability, good solvent resistance (both aqueous and non-aqueous), and good chemical resistance. It also exhibits good proton conductivity at low humidity. Therefore, it keeps a sufficiently long life when used for fuel cells under ordinary conditions (at 80 to 130° C.).

The hybrid silica polymer of the present invention can be produced more easily and economically than the conventional organic polymer such as perfluoropolymer.

EXAMPLES

The invention will be described in more detail with reference to the following examples, which are not intended to restrict the scope thereof.

Example 1

Synthesis of Hybrid Silica Polymer (1) Synthesis of Gel

Several kinds of gels were prepared from the following starting materials varying in molar ratio in the specified range.

3-MPTES (3-mercaptopropyltriethoxysilane): 1.0
Surfactant: 0.1 to 0.8
$H_2O$: 30 to 120
NaOH: 0.2 to 2

(Typical Example of Synthesis)

An aqueous solution containing 0.42 g of hexadecyltrimethyammonium bromide in 40 g of water was mixed with an aqueous solution containing 1.30 g of NaOH in 15 g of water. To the resulting solution was added continuously with stirring 11.95 g of 3-MPTES (3-mercaptopropyltriethoxysilane) to give a clear solution. Upon stirring for 90 minutes, the clear solution gave a uniform gel (with pH 12.66). This gel was divided into four portions (designated as A, B, C, and D). Each portion was allowed to stand or heated to remove water under the following conditions.

Portion A: standing at room temperature for 7 days in an open petri dish.

Portion B: standing at 60° C. for 7 days in an open petri dish.

Portion C: uniform heating at 100° C. for 3 days in a Teflon-coated stainless steel autoclave (which yielded a milky white product), followed by filtration, washing, and drying at 100° C. for 1 day.

Portion D: uniform heating at 160° C. for 3 days in a Teflon-coated stainless steel autoclave (which yielded a milky white product), followed by filtration, washing, and drying at 100° C. for 1 day.

The pressure of the autoclave was kept at 1 MPa (or about 10 atm).

All of the four portions gave samples of thiol group-containing gel (in dry form) pertaining to the present invention.

The thus obtained gel samples have the following molar composition.

3-MPTES: 1.0
Surfactant: 0.1 to 0.57
$H_2O$: 60
NaOH: 0.67

(2) Removal of Surfactant from the Gel

The gel obtained in the foregoing steps was freed of surfactant by treatment with ethanol and 4M HCl at 60° C. for 6 hours. (The amount of ethanol was 100 g for 1 g of the sample. The amount of 4M HCl was 1 mL for 1 g of the sample.) The treated gel was filtered, washed with ethanol, and dried at 60° C. for 1 day. The yield was higher than 90% (6.03 g) for all the samples.

(3) Oxidation of Thiol Group-Containing Sample

The thiol group-containing sample (with the surfactant removed) was oxidized with hydrogen peroxide (in the form of 30% aqueous solution) under the following conditions to convert the thiol group into the sulfonic group.

That is, 0.86 of the thiol group-containing sample (with the surfactant removed) was treated with 52 g of hydrogen peroxide (in the form of 30% aqueous solution) in a 50 mL reactor at room temperature for 15 minutes. The reaction product was centrifugally separated, washed with deionized water, and finally dried at room temperature. All of the resulting samples were stored in water for 8 days and then dried at 60° C. for 1 day after washing. It was found that oxidation with hydrogen peroxide converted thiol groups into sulfonic groups almost completely.

The product (hybrid silica polymer) obtained in Example 1 was observed under a scanning electron microscope. Its electron micrograph is shown in FIG. 1. It is noted that the product is an amorphous, non-mesoporous material, composed of comparatively large particles in an aggregate state, with a surface area of about 5 $m^2/g$.

Example 2

Synthesis of Hybrid Silica Polymer (1) Synthesis of Gel

Several kinds of gels were prepared from the following starting materials varying in molar ratio in the specified range.

3-MPTES (3-mercaptopropyltriethoxysilane): 1.0
Surfactant: 0.005 to 0.6
$H_2O$: 30 to 120
$NH_4OH$: 2.82

(Typical Example of Synthesis)

Synthesis started with addition of 7.58 g of hexadecyltrimethylammonium bromide to 100 g of water with stirring over 5 minutes. This step was followed by addition of 25.1 g of 3-MPTES with stirring over 10 minutes and addition of 15.5 mL of ammonium hydroxide (30% aqueous solution) with stirring over 30 minutes. The resulting milky white solution was uniformly heated in a Teflon-coated stainless steel autoclave at 100° C. for 3 days. The reaction product was centrifugally separated, washed with deionized water, and finally dried at 100° C. for 1 day. Incidentally, the pressure of the autoclave was kept at 1 MPa (or about 10 atm).

(2) Removal of Surfactant from the Gel

The gel obtained in the foregoing steps was freed of surfactant by treatment with ethanol and 4M HCl at 60° C. for 6 hours. (The amount of ethanol was 100 g for 1 g of the sample. The amount of 4M HCl was 1 mL for 1 g of the sample.) The treated gel was filtered, washed with ethanol, and dried at 60° C. for 1 day. The yield was higher than 86% (5.93 g).

The sample gave the following result of elemental analysis. Si: 22.05, S: 25.2, C: 28.5 (wt %)

(3) Oxidation of Thiol Group-Containing Sample

The thiol group-containing sample (with the surfactant removed) was oxidized with hydrogen peroxide aqueous solution under the following conditions to convert the thiol group into the sulfonic group.

That is, 0.89 g of the thiol group-containing sample (with the surfactant removed) was treated with 12 g of hydrogen peroxide (in the form of 30% aqueous solution) at room temperature for 1 hour. The reaction product was centrifugally separated, washed with deionized water, and finally dried at room temperature. It was found that oxidation with hydrogen peroxide converted thiol groups partly into sulfonic groups (which are responsible for high proton conductivity).

Treatment with hydrogen peroxide aqueous solution was carried out for a varied length of time (from 10 minutes to 4 hours). Thus, there were obtained the samples of hybrid silica polymers varying in composition as shown in Table 1.

TABLE 1

| Compositional formula | Elemental analysis (wt %) | | |
|---|---|---|---|
| | Si | S | C |
| $[HO_3S \cdot (CH_2)_3 \cdot SiO_{1.5}]_{0.92}[HS \cdot (CH_2)_3 \cdot SiO_{1.5}]_{0.08}$ | 16.4 | 18.7 | 21.1 |
| $[HO_3S \cdot (CH_2)_3 \cdot SiO_{1.5}]_{0.57}[HS \cdot (CH_2)_3 \cdot SiO_{1.5}]_{0.43}$ | 18.1 | 20.6 | 23.8 |
| $[HO_3S \cdot (CH_2)_3 \cdot SiO_{1.5}]_{0.04}[HS \cdot (CH_2)_3 \cdot SiO_{1.5}]_{0.96}$ | 21.7 | 24.8 | 28.0 |

The product (hybrid silica polymer) obtained in Example 2 was observed under a scanning electron microscope. Its electron micrograph is shown in FIG. 2. It is noted that the product is an amorphous, non-mesoporous material, composed of uniform spherical particles, with an average particle size of about 100 nm and a surface area of about 20 $m^2/g$.

[Evaluation]

Each sample of hybrid silica polymer was pulverized by using an agate mortar, and the resulting powder was formed into a cylindrical pellet, 13 mm in diameter and 0.4 mm in thickness, by using a tablet machine. The pellet (held between AC gold electrodes) was tested for proton conductivity at low humidity (less than 20%) and 25° C. and at high humidity (more than 90%) and 25° C. The result of measurement is shown Table 2.

Incidentally, the fourth and fifth samples in Table 2 were prepared in the same way as in Example 1 except that 3-MPTES was partly replaced by tetraethoxysilane.

TABLE 2

| Compositional formula | σ (S/cm) at low humidity | σ (S/cm) at high humidity |
|---|---|---|
| $HS \cdot (CH_2)_3 \cdot SiO_{1.5}$ | $10^{-8}$ | $4.2 \times 10^{-5}$ |
| $[HO_3S \cdot (CH_2)_3 \cdot SiO_{1.5}]_{0.92}[HS \cdot (CH_2)_3 \cdot SiO_{1.5}]_{0.08}$ | $4 \times 10^{-3}$ | $2.0 \times 10^{-1}$ |
| $[HO_3S \cdot (CH_2)_3 \cdot SiO_{1.5}]_{0.57}[HS \cdot (CH_2)_3 \cdot SiO_{1.5}]_{0.43}$ | $1 \times 10^{-3}$ | $1.1 \times 10^{-1}$ |
| $[HS \cdot (CH_2)_3 \cdot SiO_{1.5}]_{0.60}[SiO_2]_{0.40}$ | $10^{-8}$ | $7 \times 10^{-6}$ |
| $[HO_3S \cdot (CH_2)_3 \cdot SiO_{1.5}]_{0.58}[SiO_2]_{0.42}$ | $6 \times 10^{-4}$ | $8 \times 10^{-2}$ |

A sample of hybrid silica polymer of the formula $(HO_3S-CH_2-CH_2-CH_2-SiO_{3/2})_{0.57}(HS-CH_2-CH_2-CH_2-SiO_{3/2})_{0.43}$ was tested for proton conductivity at varied relative humidity (RH) and temperature. The results are shown in Tables 3 and 4, respectively. Incidentally, Table 3 shows the results measured at 25° C., and Table 4 shows the results measured at relative humidity lower than 5% (applicable to high temperatures).

TABLE 3

| Relative humidity (%) | σ (S/cm) |
|---|---|
| 10.8 | $4.39 \times 10^{-05}$ |
| 23.0 | $2.61 \times 10^{-03}$ |
| 39.6 | $1.17 \times 10^{-02}$ |
| 55.5 | $4.05 \times 10^{-02}$ |
| 70.1 | $7.00 \times 10^{-02}$ |
| 83.8 | $9.51 \times 10^{-02}$ |
| 94.4 | $1.11 \times 10^{-01}$ |

TABLE 4

| Temperature (° C.) | σ (S/cm) |
|---|---|
| 25 | $4.39 \times 10^{-5}$ |
| 59 | $3.4 \times 10^{-4}$ |
| 78 | $2.4 \times 10^{-3}$ |
| 98 | $7.32 \times 10^{-8}$ |
| 113 | $9.9 \times 10^{-8}$ |
| 128 | $2.03 \times 10^{-6}$ |

Exploitation in Industry

The hybrid silica polymer according to the present invention excels in thermal stability, mechanical stability, resistence to aqueous and non-aqueous solvents, and proton conductivity.

It provides good thermal stability (higher than 150° C. measured by TGA) required of electrochemical elements (such as fuel cells) which are used at about −20° C. to 130° C. It also provises good mechanical and chemical stability and exhibits good proton conductivity even at low humidity on account of its self humidifying property. It will find use as electrochemical elements for fuel cells, capacitors, and electrolytic cells.

In addition, the manufacturing method according to the present invention permits economical production of the hybrid silica polymer having the above-mentioned characteristic properties.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for producing a hybrid silica polymer composition comprising heating a mixture of 3-mercaptopropyltrialkoxylsilane, surfactant, water, and base or acid for reaction at 25 to 180°C., thereby providing a hybrid thiol group-containing silica polymer, and oxidizing the hybrid thiol group-containing silica polymer with a peroxide, thereby providing a hybrid silica polymer which is composed of hybrid silica polymer that includes at least one of a thiol group and a sulfonic group, wherein the hybrid silica polymer is represented by a formula (1) and accounts for more than 90 wt % of the hybrid silica polymer composition:

$$(HO_3S—CH_2—CH_2—CH_2—SiO_{3/2})_n(HS—CH_2—CH_2—CH_2—SiO_{3/2})_{1-n} \quad (1)$$

where n ranges from 0.03 to less than 1, wherein the base or acid is ammonium hydroxide.

* * * * *